INVENTOR
W. M. MILLER
BY John E. Wagner
ATTORNEY

INVENTOR
W. M. MILLER
BY John E. Wagner
ATTORNEY

INVENTOR
W. M. MILLER
BY John E. Wagner
ATTORNEY

INVENTOR
W. M. MILLER
BY John E. Wagner
ATTORNEY

INVENTOR
W. M. MILLER
BY John E. Wagner
ATTORNEY 3,050,584

CONFERENCE TELEPHONE APPARATUS

Wade M. Miller, Pittsburgh, Pa., assignor to American Telephone and Telegraph Company, New York, N.Y., a corporation of New York Filed Dec. 24, 1958, Ser. No. 782,748
12 Claims. (Cl. 179—1)

This invention relates to conference telephone systems and more particularly to such systems including automatic voice controlled switching of gain of the incoming and outgoing channels.

Conference loud speaking telephone systems are intended to fill a definite need in allowing a number of persons located in one area such as in a conference room to carry on a conversation over telephone lines with a similar group in a remote location or, for that matter, with a single person employing a telephone handset. Systems of this type are intended to extend to conference or similar sized gatherings unobstructed, substantially normal two-way conversation between any of the persons in the conference room and any other subscriber having access to the exchange and toll telephone networks.

Such systems should ideally simulate, for all practical auditory purposes, the presence of the remote party or parties within the room and should not restrict the location or movement of the conferees. In order to provide such service, it is essential that the fields of the loudspeaker and microphones coincide, to wit, cover substantially the entire room. The latter requirement poses the immediate problem of system stability in that the coinciding fields of the microphone and loudspeaker allow the detection by the microphone of sounds emanating from the loudspeaker in the same manner as sounds originating within the room. With these conditions and with a suitable electrical path through the system such sounds may be transmitted back to the loudspeaker and thence into the room. If, at any frequency in the speech or ambient noise range the transmission losses in the acoustic-electrical path are exceeded by the sum of the gains, a singing condition will be established which will render the system unusable. Prevention of the occurrence of such condition is a prime requisite for achieving the objective of system stability.

Numerous contributors to the art have sought to minimize the conditions giving rise to singing, and the most successful approach has been that of voice switching, to wit, the incorporation in the system of control means for varying the gain in the incoming and outgoing channels inversely in response to signals in one or the other branches so that at any instant the total gain in the acoustic electrical feed back loop does not exceed losses therein. It is found, however, that the mere provision of voice actuated gain switching in conference telephone equipment is insufficient to insure system stability under all conditions and furthermore tends to produce an artificial effect unless, to the users, both the incoming and outgoing channels appear to be continuously and simultaneously operative.

System instability, even with gain switching becomes a significant problem during the transient conditions associated with the establishment of a call, termination or interruption thereof. This may be clearly understood when it is considered that the microphones and the loudspeaker employed in the system are essentially nonreciprocal devices and hence their associated circuitry is operated on a four-wire basis, i.e., a one-way path for reception terminating in the loudspeakers and a separate one-way path for transmission terminating in the microphone. The subscribers' loop network within a telephone exchange area is ordinarily operated on a two-wire basis for transmission in both directions. Thus, it is necessary if the two systems are to work together to use a hybrid transformer or equivalent device with an associated balancing network at the junction between the two-wire and four-wire systems. If the transmitting and receiving functions are to be available simultaneously without interfering with each other, the adjustment of the balancing network to simulate exactly the characteristics of the two-wire loop is very critical. It therefore follows that when different distant subscribers are called successively, the electrical impedance characteristics as seen from the hybrid line terminals may very well change, and if hybrid balance is to be maintained, an adjustment of the balancing network will be necessary.

Obviously, the system is impractical if it must be readjusted at the time each call is established. In the event this adjustment is not made and a condition of imbalance between the line and the network does exist, sounds entering the microphone will pass through the feedback path across the hybrid into the loudspeaker and back into the room, introducing the possibility of regeneration and singing as discussed above.

Thus, in the interest of insuring stability of the system when it is in use a high degree of hybrid balance is normally desirable. This necessitates the use of an automatically adjusted balancing network which tends to balance the loop impedance within limits. However, during the periods of establishing or terminating a connection, when the line termination may appear as an open circuit, the extreme unbalance in the hybrid allows hybrid leakage currents into the incoming channel from the outgoing channel at a level greater than most incoming signals. Under these conditions voice switching alone may be insufficient to maintain system stability.

The second problem in employing voice control gain switching is that of producing the psychological effect for the conferees of face-to-face conversation at least in the auditory sense with the remote party. Of course, any such objective is limited by the monaural nature of the system as compared with face-to-face contact. Aside from that aspect, a gain switching system desirably should apparently maintain the gain of the incoming channel uniform so that all incoming speech currents including the first and last syllable of the transmission are at the transmitted level. Further, it is desirable that pauses between words or syllables do not affect the gain characteristics to produce unwanted switching. Furthermore, it is desirable that local noise in the nature of the ambient or of local non-speech energy fail to produce a switching of the direction of transmission. However, it is also essential in order to provide the desired auditory conditions that either party be interrupted readily by the other merely by the same method employed in face-to-face contact, that is, of raising the level of one's own voice. These factors which may be described as being of a psycho-acoustic nature are of extreme significance in the design of a useful conference system.

With this understanding of the requisites of a useful conference system not provided by voice switching per se, it is a general object of this invention to improve conference type telephone systems.

Another object of this invention is to insure system stability under all conditions and at all times when the system is operative.

Another object of this invention is to provide gain switching in the interest of system stability but in a manner which becomes unnoticeable either to the conferees or to the remote party.

Still another object of this invention is to provide switching control which is insensitive to ambient noise regardless of level or uniformity within practical limts.

Still another object of this invention is to enhance the insensitivity of the control system to non-speech sounds above the level of the ambient.

One further object of this invention is to allow the rapid switching of gain in the transmission channels under conditions of rapid interchange of speech while still providing sufficient holdover of control during pauses of an uninterrupted speaker.

These objects are achieved in accordance with this invention, one embodiment of which comprises a conference telephone set including an incoming and an outgoing channel connected via a hybrid coil and balancing network to a conventional telephone line. The incoming channel includes an amplifier and a variable loss network and a loudspeaker. The outgoing channel includes a microphone, an amplifier and a variable loss network. A common control device which is a form of monostable multivibrator and here a gain inverter is connected to vary the gains of the incoming and outgoing channels inversely simultaneously. The incoming channel includes a low-pass filter for eliminating all frequencies above a practical telephone frequency, e.g., 3100 cycles per second while the outgoing channel employs a microphone having a broader response characteristics. A high-pass filter is included in a branch circuit from the outgoing channel to derive a control current from high frequencies in the outgoing channel for operating the gain inverter and increasing the gain in the outgoing channel while decreasing the incoming gain. A second branch from the outgoing channel includes a phase shift controlled network which is normally responsive only to energy in the outgoing channel having a syllabic frequency content, i.e., in the order of 6 or 7 cycles per second. This latter branch circuit also includes an amplifier and rectifier for deriving a control current from all signals in the outgoing channel which are permitted to pass through the phase shift controlled network after being triggered by syllabic frequencies. A similar amplifier and rectifier derives a control voltage from incoming energy. The two-control voltages are applied to a common point. The voltage of the common point is therefore normally a function of the presence or absence of incoming signals and the presence or absence of local syllabic frequency containing energy.

One feature of this invention resides in the frequency selective characteristic relationship of the receiving and transmitting channels whereby control voltages for varying the gain of the respective channels is derived from frequency components present in only one of the channels.

Another feature of this invention relates to the additional frequency selective nature of the control circuit for the switching of the transmission channels in that in the presence of normal ambient noise the control circuit is fully operative only in the presence of local acoustic energy having a particular characteristic common to human speech, to wit, the presence of syllabic frequencies.

Another feature involves the presence of an automatic gain control circuit for the switching control which is operative to adjust the threshold of switching with varying levels of local ambient noise.

Still another feature of this invention resides in the presence of a frequency selective threshold determining circuit which lowers the level of the switching threshold in the presence of syllabic frequency containing energy in the transmitting channel.

One further feature of this invention involves the presence of means for generating control voltages from both the transmitting and receiving channels either of which is operative to suspend change of the automatic gain controlling circuit during periods of signal transmissions in either direction.

Another feature of this invention is based upon the presence of means responsive to locally generated sound for disabling the receiving channel control signal device whereby any transmitted speech which reaches the receiving channel through hybrid coils leakage is inoperative to switch the apparatus from transmitting to receiving condition.

Still another feature of this invention is based upon the provision of a slow discharge holdover control device to maintain the apparatus in the transmitting condition during pauses of local speech but providing a rapid discharge path for the device when speech energy appears in the other channel to allow rapid conversational interchange.

These and other features of this invention may be more clearly understood from the following detailed description by reference to the drawings wherein:

FIGS. 1, 2, 3 and 4 constitute an electrical schematic representation of an embodiment of this invention;

*General Description*

Figure 1:
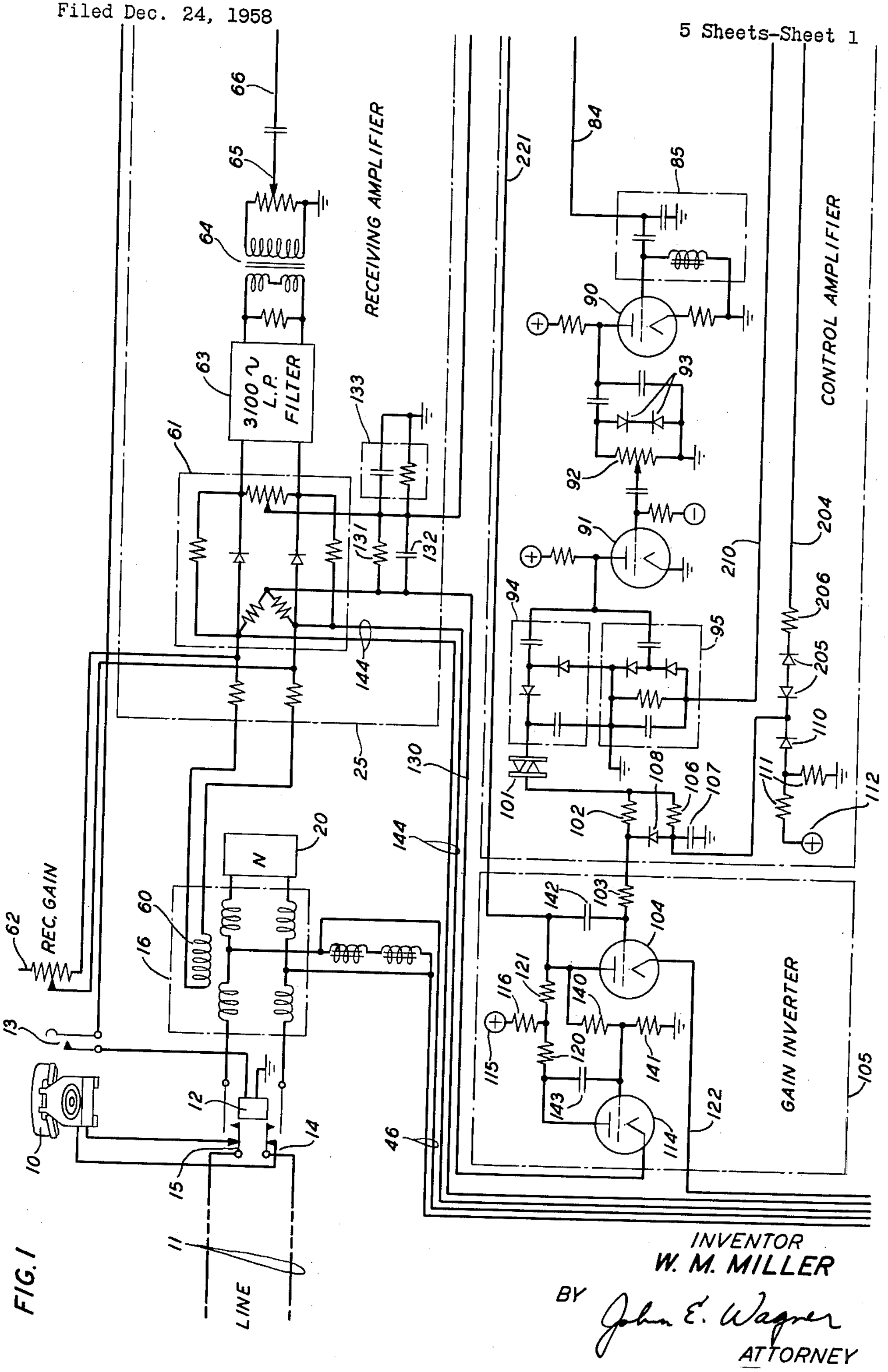
Figure 2:
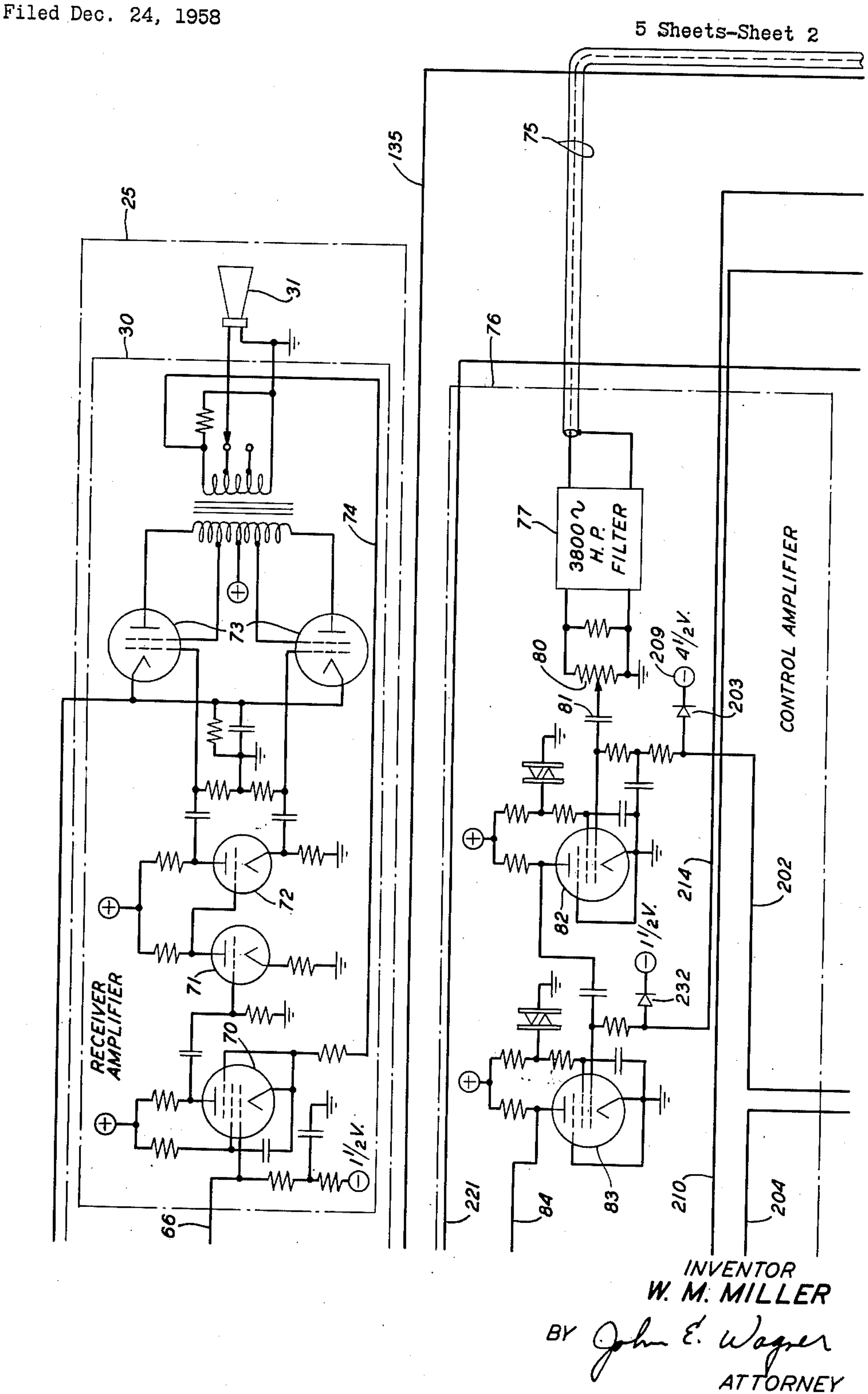
Figure 3:
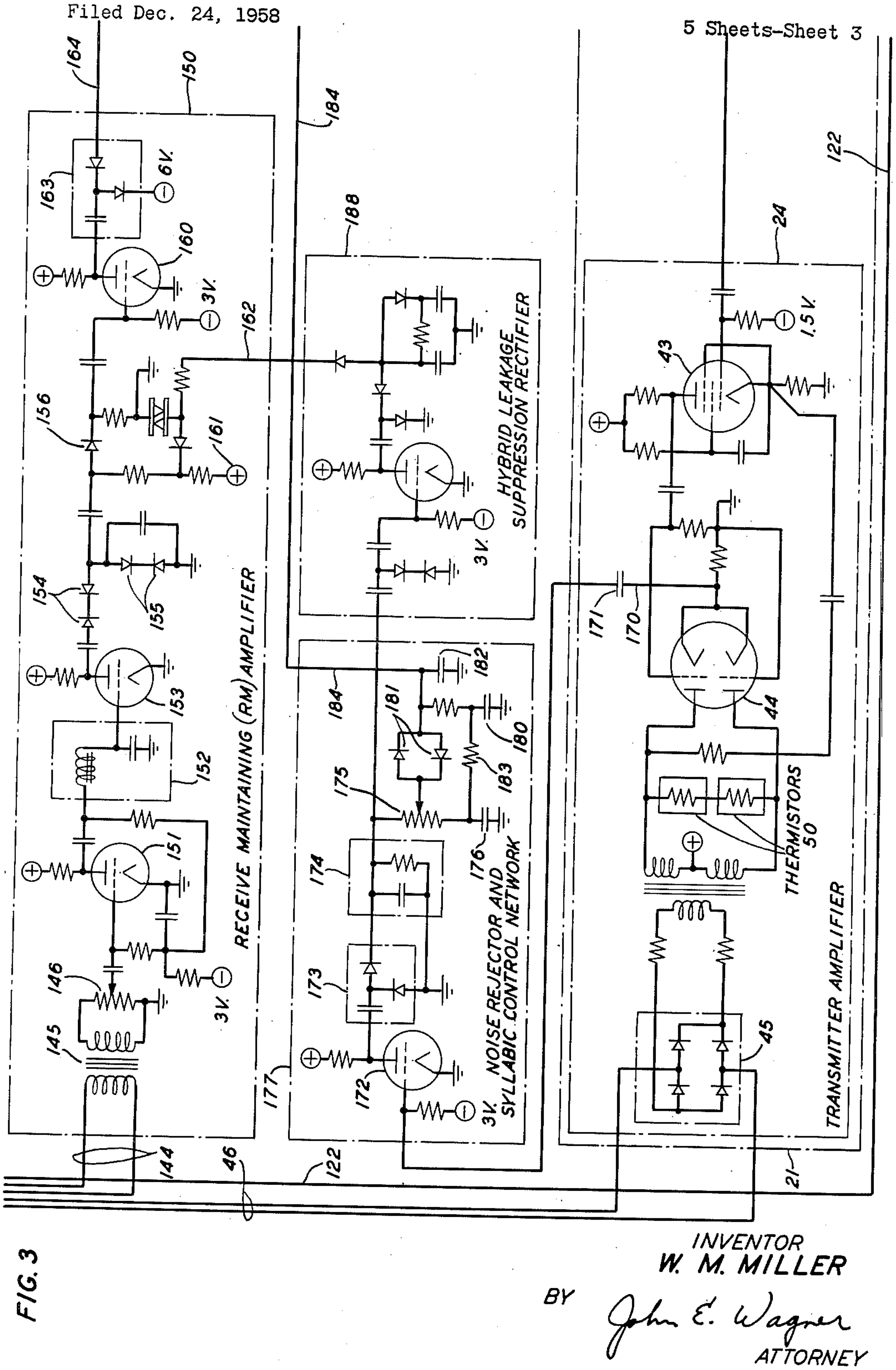

Referring now to FIGS. 1–4, wherein a conference telephone installation may be seen, the installation and a conventional telephone set 10 are arranged to be selectively connected to a telephone line 11 by operation of a relay 12 under the control of a manual switch 13. Normally, the telephone set 10 is connected through back contacts 14 and 15 of the relay to the line 11 for ordinary use including the establishment of calls with a rotary dial. The conference telephone installation comprises a conventional hybrid coil 16 with an associated line impedance balancing network 20, a transmitting channel 21 appearing in FIGS. 3 and 4 including a microphone 22 and suitable amplifiers 23 and 24, a receiving channel 25 appearing in FIGS. 1 and 2 including an amplifier 30 which drives a loudspeaker 31, and control circuitry comprising the remainder of FIGS. 1–4 varying inversely the gain of the transmitting and receiving channels 21 and 25 dependent upon the direction of speech at any instant.

*Transmitting Channel*

Referring first to the transmitting channel 21, it may be seen as including the microphone 22 having a comparatively broad frequency range, e.g., 60–10,000 cycles per second, arranged to pick up all sounds in the room. The terminals of microphone 22 are connected to a preamplifier 23 which delivers the amplified sound at a level of about −20 dbm. This program material has low frequencies rolled off by a series capacitor 32 at the output of the preamplifier 23 and attenuated by a resistance pad made up of resistors 33 before being introduced into a variable resistance network, the transmitting variolosser 34. The transmitting variolosser 34 comprises series branches in each side of the line including a parallel resistor 35, varistor 36 combination and shunt resistor branches 40. A direct current control path for the variolosser 34 is between the center tap of transformer 41 at the input and a transformer 42 at the output. The overall direct current attenuation characteristic of the transmitting variolosser 34 has a negative slope whereby the attenuation decreases with increases in direct current through the control path. If this variolosser 34 is not conditioned for transmitting, program material passing therethrough incurs approximately 30 decibels more attenuation and then may be considered lost. When the transmitting variolosser 34 is conditioned for transmission, it introduces only an insignificant amount of attenuation and the program material is introduced into additional stages of amplification of amplifier 24 including a pentode stage and a pair of push-pull connected triodes 44 which raise the level of the program material for introduction via a varistor network 45 and conductors 46 into the hybrid coil and thence to the telephone line 11. The output of the push-pull connected triodes 44 includes a pair of shunt thermistors 50 for high level signal attenuation. The varistor network 45 is responsive to the presence of central office supervisory direct current in the line conductors 11 to lower the impedance of the transmitting channel. In the absence of supervisory current, e.g., when the conference installation is conditioned but not connected to the line 11, the varistor network 45 effectively opens the transmitting circuit to minimize the likelihood of singing during the idle line condition. Associated with the transmitting channel 21 also is a polarized relay 51 which is operated in the presence of local program material at the output of the preamplifier to light an indicator bulb 52 as a signal that the transmitting channel is conditioned as hereinafter described.

*Receiving Channel*

Referring now to the receiving channel 25, the third winding 60 of the hybrid coil forms the input to the receiving channel. This winding 60 isolates the receiving channel 25 from the supervisory direct current. This is necessary since the receiving channel includes a variolosser 61 which is direct current responsive for varying the gain of the receiving channel 25. The transmitting and receiving variolossers 34 and 61 which are substantially identical have complementary smooth direct current attenuation characteristics so that an inverse variation in channel gain is obtained. A receiving gain rheostat 62 which is normally physically associated with the on-off switch 13 for the installation is bridged across the input to the receiving variolosser 61. The variolosser 61 feeds a 3100 cycle per second low-pass filter 63 through which incoming program material passes while higher frequency noise distortion or speech components are attenuated. Connected through the filter 63, a coupling transformer 64, a secondary gain control 65 and conductor 66 are three stages 70, 71 and 72 of amplification followed by a push-pull output stage 73 constituting the receiving amplifier 30 which drives the loudspeaker 31. The receiver amplifier 30 employs negative feedback via the conductor 74 to reduce noise and distortion and also to reduce the output impedance so that the loudspeaker is heavily damped.

*Loss Switching Circuits*

The elements of the installation described above form the requisites for a conventional voice switched telephone system when some means for controlling the variolossers 34 and 61 is supplied. In this particular case, that means is furnished by a branch circuit from the preamplifier 23 of the transmitting channel 21 via a shielded conductor 75 to the control amplifier 76 having as its input a 3800 cycle high-pass filter 77. High frequency components of speech background noise, etc., passing through this filter 77 and its output termination are connected through a potentiometer 80 and a capacitor 81 to the control grid of a variable Mu pentode 82 (V1). The output of the pentode 82 (V1) is coupled to the control grid of a second variable Mu pentode 83 (V2). Output from pentode 83 (V2) is introduced through conductor 84 and a simple bandpass filter 85 to additional stages of amplification 90 and 91 (V3A and B). The bandpass filter 85 attenuates high frequencies above 8000 cycles per second which are considered to contribute little as derivatives of speech but may be prominent in mechanical operations such as rustling of papers, etc. More important, it suppresses hum and most tube microphonics which fall outside the lower edge of the passband at about 3800 cycles per second. The first stage 90 (V3A) contributes some gain and provides a fairly low impedance source to supply an output level control 92. This control is shunted by two opposing series connected varistors 93 which limit the maximum signal into the output stage of control amplifier 76 to about 6 volts peak-to-peak to prevent blocking of the output stage 91 (V3B) on loud sounds.

The output stage drives two voltage doubler rectifier systems, the first doubler 94 provides a positive voltage for the loss switching control of the transmitting and receiving channels 21 and 25 while the second voltage doubler 95 provides a negative voltage for an automatic gain control circuit 100 described hereinafter.

The positive control voltage is fed through a varistor 101 and a pair of series resistors 102 and 103 to the grid of the first triode 104 of a gain inverter circuit.

Loss switching is accomplished under the direction of the control amplifiers by bias changes of the positive control voltage from the control amplifier 76 on the grid of triode 104 (V4A) which produce conduction of triode 104 (V4A) while cutting off conduction of a similar triode 114 (V4B). Triodes 104 (V4A) and 114 (V4B) are supplied with plate voltage from a common supply 115 through resistors 116, 120 and 121. The cathode circuit of the triode 104 (V4A) includes through the conductor 122 in addition to the resistor 123 and its associated capacitor 124 appearing in FIG. 4, the direct current control path of the transmitting variolosser 34, through conductor 125, the center taps of transformers 41 and 42 and then to ground through a parallel resistance-capacitance network 126. Similarly, the cathode circuit of the triode 114 (V4B) connected through conductor 130 includes a resistor 131 and its associated capacitor 132 and the direct current path through the receiving variolosser 61 in parallal with the resistor 131 and thence through the parallel capacitor-resistor network 133 to ground.

Figure 4:
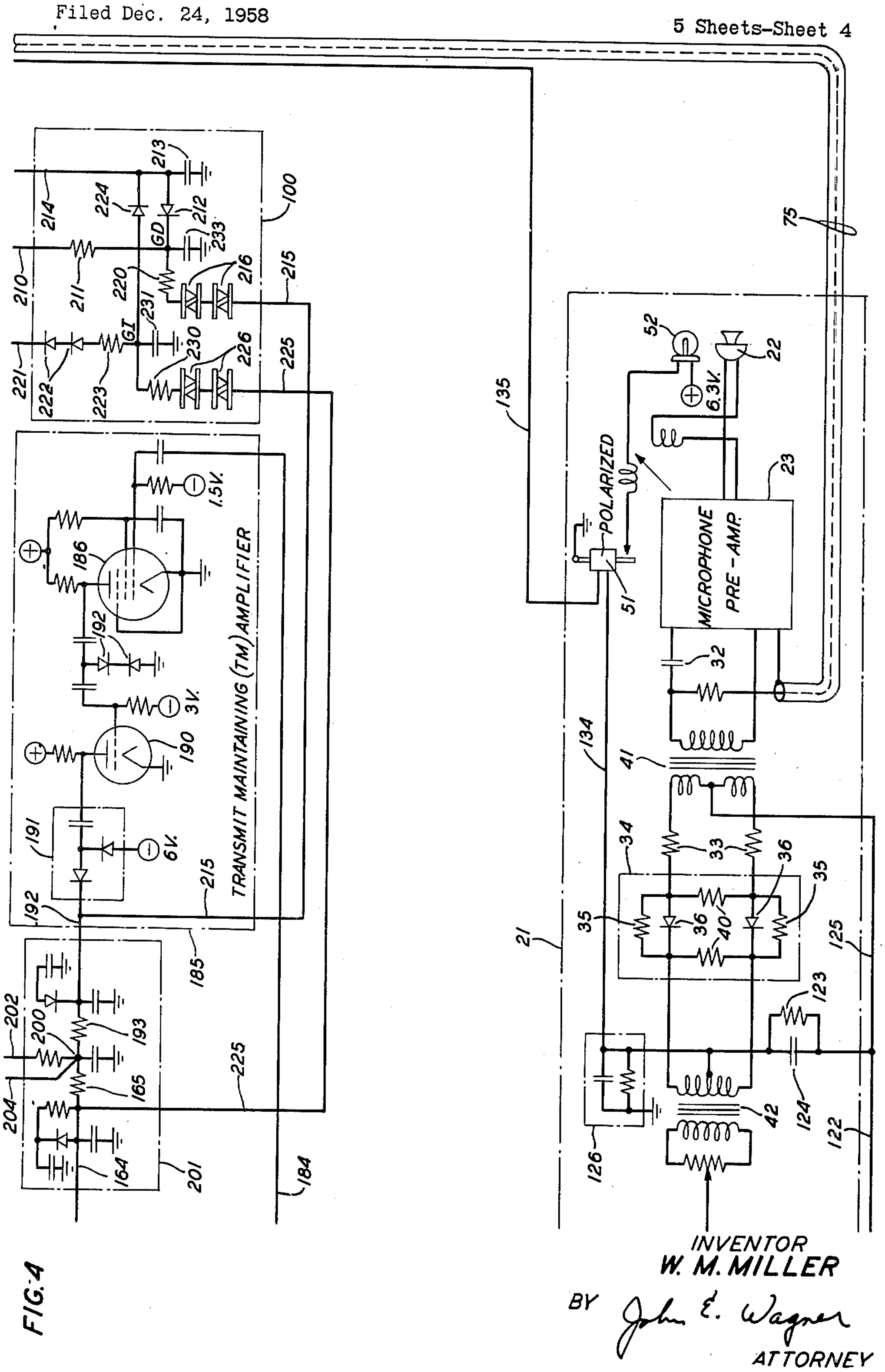
Figure 6:
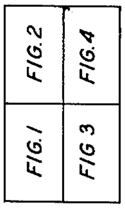
FIG. 6 is illustrative of the arrangement of FIGS. 1–4.

A low resistance connection between the cathode circuits of the triodes 104 (V4A) and 114 (V4B) is present in the form of conductor 134, the winding of the polarized relay 51 in the indicator circuit and the conductor 135, all appearing in FIG. 4. The triodes 104 (V4A) and 114 (V4B) are therefore cathode loaded by their individual variolossers 34 and 61 respectively. Conduction of one or the other of the triodes 104 or 114 is achieved by the biasing of the grid of triode 114 (V4B) through a voltage divider made up of resistors 140 and 141 connected between ground and the plate circuit of triode 104 (V4A). With approximately 250 volts plate supply and appropriate valued resistors 116, 120 and 121 approximately one milliampere of plate current is available which can pass through either the transmitting or receiving variolosser 34 or 61 or be divided between the two, depending upon the conduction state of the triodes 104 (V4A) and 114 (V4B). In the absence of any signal on the grid of triode 104 (V4A) from the control amplifier 76, the grid and cathode of the triode 114 (V4B) will be at approximately +9 or 10 volts allowing triode 114 (V4B) to conduct with the current flowing through the receiving variolosser 61, switching it to its low impedance condition and allowing the incoming signal to reach the amplifier stages of the receiver amplifier 30 and loudspeaker 31. If a positive signal voltage from the control amplifier 76 is applied to the grid of the triode 104 (V4A), current flows through the resistor 121 to the plate of that tube lowering its potential. This reduces the positive bias applied to the grid of triode 114 (V4B) and consequently its cathode current. Since the high resistance in both plate and cathode circuits are common to both triodes 104 (V4A) and 114 (V4B), the transfer of conduction from tube 114 (V4B) to tube 104 (V4A) and the switching of loss from the transmitting variolosser 34 to the receiving variolosser 61 is smooth. If the control voltage on the grid of tube 104 (V4A) is adequate, tube 114 (V4B) is cut off for a complete switch of gain. Small damping capacitors 142 and 143 are connected between plates and grids of each triode to suppress fluttering.

The control voltage from control amplifier 76 in addition to being applied to the grid of triode 104 is also available through a resistor 106 to charge a capacitor 107 without appreciably delaying the voltage rise at the triode 104 (V4A) grid. This capacitor 107 so connected can sustain the potential at the grid of triode 104 (V4A) via its associated varistor 108 as the control voltage falls with speech fluctuations, thereby to maintain continuity of control. Grid current in the triode 104 (V4A) and the high series resistance prevent the accumulation of an excessive voltage in the capacitor 107 which would slow down switching to the receiving condition during rapid dialogue. A diode 110 and resistance voltage divider 111 in series with a direct current supply 112 prevents the sustaining capacitor voltage from falling below about 7 volts. This is one or two volts below that necessary to take control at the triode 104 (V4A) and prevents accumulation of a large negative voltage from the guard circuit described later which would retard seizure of control by the transmitting channel.

*Guard Circuits*

Without some means of desensitizing the control amplifier 76 during incoming speech, local noise or private remarks of those present in the conference would interrupt incoming speech for the duration of the interference. Therefore, apparatus in accordance with this invention includes a receiving condition maintaining (RM) circuit 150, a means for deriving a negative bias for the control tube 82 (V1) from incoming speech, to minimize such interruptions. The apparatus also includes a positive bias for the same tube from the transmitting channel 21 to boost the control gain and to retard discharge of the capacitor 107 in amplifier 76. These negative and positive voltages may be termed the Receive Maintaining (RM) and Transmit Maintaining (TM) and will be so referred to hereinafter. The apparatus includes a hybrid leakage suppressor 188 for deriving additional control voltage obtained from the transmitting channel 21 which blocks the RM circuit 150 to prevent false operation on transmitted speech which leaks around the hybrid coil 16 into the receiving channel 25. Such leakage could otherwise cause self-blocking to transmitted speech.

The Receive Maintaining or RM circuit, which maintains the installation in receiving condition to speech in the presence of local noise, is coupled to the incoming channel 25 by conductors 144, a transformer 145, a potentiometer 146 and a capacitor 150 in the grid circuit of a triode 151 (V5A) constituting the input stage of the RM amplifier. The output of the triode 151 (V5A) is coupled through a simple low-pass filter 152 to its second stage 153 (V5B). This filter 152 passes nearly the full message bandwidth received with incoming speech but eliminates most of the high frequency content of hybrid leakage originating in the transmitting channel 21. This is desirable to compensate for the frequency characteristics of the hybrid leakage suppression circuit described hereinafter.

The output of the triode 153 (V5B) is a speech signal of substantial amplitude with a rather high background of hum, tube and line noise, room noise from the distant transmitter, etc. To remove the effect of this background, the signal is passed through two series opposing varistors 154 which effectively open the transmission path for signals smaller than a predetermined level, e.g., 6 volts peak-to-peak. Speech signals sufficient to pass this minimum signal suppressor are then clipped to a maximum of 6 volts peak-to-peak by a similar pair of varistors 155 in shunt to ground. The signal is next introduced through an additional varistor 156 which is normally biased to conduct to the grid of a tube 160 (V6A). Conduction bias for the varistor 156 comes from a direct current supply 161. While the transmitting channel is active, a negative voltage over lead 162 overcomes the conduction bias and when greater than −6 volts, effectively opens the transmission path through the RM circuit 150 as is hereinafter described. The output of the tube 160 (V6A) is rectified in a voltage doubler 163 and introduced into conductor 164 as a negative voltage referred to a −6 volt reference point. This is the RM voltage.

The transmitting channel amplifier 24 is tapped by conductor 170 at the cathodes of the push-pull output stage 44 (V9) and fed through a capacitor 171 to the grid of a tube 172 (V17A) which amplifies the outgoing signal. The amplified output of the tube 172 (V17A) is rectified in a voltage coupler 173 with a principal load of a parallel resistor-capacitor combination 174. The RC constants of the combination have been chosen so that A.-C. voltage across the load becomes small as the frequency approaches 3000 cycles and at higher frequencies only the direct current component is significant. The A.-C. voltage can follow the lower frequencies, however, and the voltage envelope developed across the load follows the peak instantaneous sums of all such voltages present in the transmitted signal. A principal function of this element of the combination is to recover the syllabic characteristic if present in the transmitted sound. The parallel resistance-capacitance combination 174 is connected to a second load consisting of a potentiometer 175 connected to ground through capacitor 176 whereby the average direct current and syllabic components appear across the capacitor 176 and the A.-C. voltage across the potentiometer 175. With proper values of the components, the reactance of the capacitor equals approximately 0.25 megohm at about 6½ cycles per second. A second capacitor 180 through a resistor 183 shunts the capacitor 176 and assumes the same average direct current potential. It also follows the same syllabic voltages if present but later in phase. This phase shift is at least 45° if the syllabic rate is 5 cycles or higher. Potentials of these two capacitors 176 and 180 are used to disable a small signal suppressor 181 in the presence of syllabic pulsations.

A portion of the A.-C. voltage developed across the potentiometer 175 is introduced to a parallel reversed poled diode combination 181 which suppresses signals below their ½ volt threshold of conduction. High residual transmission through the small signal suppressor 181 is by-passed to ground by a capacitor 182. Signal levels are so chosen that the A.-C. voltage across the diode 181 due to background noise is below the conduction threshold. Thus, the transmission path is effectively open until some loud sound or speech occurs with sufficient amplitude to exceed the threshold. This is the operation in the absence of syllabic disturbance when the potentials of the two capacitors 176 and 180 are equal and apply equal bias voltages regardless of their magnitude to each side of the small signal suppressor 181. However, when syllabic or equivalent fluctuations are present in the transmitted sound, the phase difference between the two capacitors 176 and 180 causes bias voltage differences to appear across the diodes 181 to reduce or eliminate the threshold voltage and enable small voice signals to pass the suppressor 181 and be introduced into the conductor 184 which forms the input of the TM amplifier 185. This amplifier 185 itself includes a pentode voltage amplifier 186 (V7) and a triode output stage 190 (V6B) which drive a voltage doubler 191. Coupling between these stages is shunted by a series opposing pair of varistors 192 to limit the maximum signal applied to the triode 190 (V6B) to about 6 volts peak-to-peak to prevent any blocking on very strong local signals. The output of the TM amplifier is a positive voltage referred to a −6 volt reference point.

The negative voltage from the RM circuit on lead 164 and the positive voltage from the TM circuit on lead 192 are introduced via resistors 165 and 193, respectively, to a common point 200 in the combining network 201 from which the resultant voltage is introduced via lead 202 as a control bias for the pentode 82 (V1) in the control amplifier 76. This input serves to increase the control channel gain to protect continuity of control if the transmitting channel 21 is operative and decreases the gain to minimize interruptions by local noise if the receiving channel 25 is operative. A clamping diode 203 between the lead 202 and a minus voltage source 204 stops positive voltage excursions to prevent grid current. The voltage of the common point 200 also controls the drainage of the capacitor 107 via the conductor 204 and thereby affects the control of the gain inverter tubes 104 and 114. In the gain inverter circuit 105 switching takes place with a positive voltage, e.g., 9 volts at the grid of triode 104 (V4A). A discharge circuit for the grid voltage includes a pair of oppositely-poled varistors 205 and a resistor 206 connected via the conductor 204 to the common point 200. At very small reverse currents, the varistors 205 provide a Zener voltage drop of about 13½ volts. With both the RM and the TM circuits 150 and 185 idle, this leaves only about one volt across the resistor 206 to drain the grid voltage very slowly and if one or two volts from the positive voltage source of the TM amplifier 185 is present, drainage of the grid circuit of triode 104 is suspended completely. However, if an incoming signal is received as when the remote party seeks to break into the conversation and thereby generates an RM voltage on lead 164, that negative voltage applied to the conductor 204 forces drainage of the capacitor 107 very quickly. The varistors 205 prevent a reverse application of a large positive voltage to the capacitor 107 when the TM circuit is active and would otherwise retard prompt return of control to the distant party.

*Automatic Gain Control*

The installation includes an automatic gain control circuit 100 which operates on background noise in the spectrum passed by the high-pass filter 77 of the control amplifier 76 and is operative to adjust the grid bias on the pentode 83 (V2) to adjust the gain in the control amplifier 76 for the level of the ambient noise in the conference room. For purposes of explanation, we will assume that the control amplifier 76 gain is excessive for a given environment and no speech is present at either end of the telephone connection, the transmitting channel 21 will thereupon be energized. This is accomplished by the output of the triode 91 (V3B) which switches the gain inverter 105 so that the tube 104 (V4A) is conducting and tube 114 (V4B) is cut off. The output of the pentode 91 (V3B) also is connected through the voltage doubling diodes 95 to supply a negative voltage over the conductor 210 through resistor 211 to the point GD, through the varistor 212 of the automatic gain control circuit 100 to build up a negative voltage in an integrating capacitor 213. The capacitor 213 with one terminal grounded is connected via conductor 214 to the grid of the pentode 83 (V2).

Since this automatic gain control circuit 100 is operative for all signals at the output of the triode 91 (V3B), the increasing negative voltage on conductor 214 would tend to slowly disable outgoing speech. Therefore, a branch of the TM circuit 185 output is connected via conductor 215 through a pair of voltage dropping varistors 216, a resistor 220 and point GD to place a positive charge in capacitor 233 on peaks of outgoing speech. This charge slowly disappears through the resistor 211 to the negative voltage doubler 95 in the output of the triode 91 (V3B) and effectively disables the gain decreasing circuit through the period of such peaks. When the gain is decreased or room conditions have changed so that the gain inverter 105 no longer rests in the transmitting direction and no speech is in progress, the automatic gain control circuit 100 is operative to increase the gain in the control amplifier tube 83 (V2).

The plate of the tube 104 (V4A) in the example shown has a positive potential of approximately 100 volts when the conference installation is in the receiving condition and approximately 40 volts when in the transmitting condition. The plate of tube 104 (V4A) is connected via the conductor 221 to a pair of varistors 222 having a Zener voltage drop of 95 to 100 volts and a resistor 223 to the gain increasing point GI, thence through a varistor 224 to the integrating capacitor 213. This input allows the lowering of the negative charge in the capacitor 213 until the noise at the output of the triode 91 (V3B) is sufficient either to drain the charge through the varistor 212 and conductor 210, or to switch the condition of the gain inverter 105. As the gain inverter 105 goes towards the transmitting side, the potential of the plate of tube 104 (V4A) falls and disables the gain increasing circuit as soon as the plate potential of tube 104 (V4A) minus the Zener voltage of the varistors 222 equals the bias voltage in the integrating capacitor 213.

To prevent gain increasing during the periods of incoming speech when the gain inverter 105 is locked in the receiving condition and the control channel is blocked at the pentode 82 (V1) a negative voltage from RM amplifier 150 via leads 164, 225, varistors 226 and resistor 230 is introduced into a capacitor 231 associated with the GI circuit to divert the gain increasing current temporarily. A varistor 232 clamps the bias of the pentode 83 (V2) to a negative voltage such as −1½ volts in the case of overtravel of the point GI through adjustment trouble or an unusually quiet environment.

Peak storage of the two capacitors 233 and 231 is adequate to disable both the gain increasing GI and gain decreasing GD circuits as dialogue takes place and the control input at the potentiometer 80 (P1) in the control amplifier 76 can be varied over considerable range with no change in performance when the circuit has a few quiescent moments between speech to readjust the gain of the control amplifier 76. The varistors 226 and 216 in the automatic gain control circuit 100 through their connections to the RM circuit 150 and the TM circuit 185 prevent disabling of that circuit by a residual and background noise below normal speech peaks.

The conference telephone installation in accordance with this invention employing voice control switching of gain in the transmission channel 21 includes means for differentiating between sounds originating in the conference room and those emanating in the loudspeaker 31 by employing a filtering system. The filtering system includes one filter in the input to the control circuit 76 for the loss transfer and another in the loudspeaker receiving path. With this arrangement, the frequencies allowed to enter and activate the control circuit 76 are deleted from the loudspeaker 31 output preventing incoming speech from switching loss into the receiving branch 25. Speech originating within the room will contain the necessary frequencies to actuate the control circuit and adjust the system for transmitting. The establishment of preferred frequencies which do not appreciably degrade transmission in either direction is essential and this may be accomplished by the use of frequencies above 4000 cycles per second for control purposes, whereupon a 3800 cycle per second highpass filter 77 is included in the input to the control circuit 76 and a 3100 cycle per second low-pass filter 63 is included in the loudspeaker 31 path. The frequencies between 4000 and 8000 cycles per second contain sufficient components to allow reliable switching of the apparatus while the 3100 cycle per second upper limit for incoming speech is not unduly restrictive for use in conventional telephone systems. Furthermore, the effect of high frequency hybrid unbalance is minimized.

The control circuit 76 in addition to maintaining loss in the transmitting channel 21 until energized to transfer it to the receiving channel 25 allows either the transmitting or receiving stations to vocally seize control and at the same time allows either the transmitting or receiving party momentary pauses in transmission without being subjected to a reversion of control by background noises.

Furthermore, in the absence of speech from either direction, the automatic gain control circuit 100 samples high frequency ambient noise in the conference room and adjusts the control amplifier 76 until the gain inverter 105 is at the threshold of switching loss from the transmitting path. This gain setting is retained as the charge in the capacitor 213 and speech in either direction prevents any change in that charge until a lull in the conversation permits readjustment. Optimum control sensitivity is thus maintained over widely varying room noise conditions.

Gain in the control circuit 76 is further regulated by the negative RM voltage derived from incoming speech and a positive TM voltage derived from the transmitted speech. These positive and negative voltages are combined at point 200 to eradicate residuals and the resultant positive or negative output acts on the control circuit 76 gain to guard against interruptions while speech is in progress from either end. A very slow discharge of the gain inverter 105 control voltage on capacitor 107 to the combining point 200 of the RM and TM voltages is permitted under idle conditions. This discharge is blocked by a moderate TM voltage at point 200 generated from room noise frequencies present in transmitter amplifier 24 to enhance continuity of control between transmitting pauses but discharge becomes very rapid in the presence of a high negative voltage from the RM amplifier 150 if the distant end breaks in during a transmitting pause and generates an RM voltage. Presence of the positive TM voltage in the control amplifier 76 also enhances its ability to detect the continuing presence of low level high frequency components of speech originating in the conference room.

Noise rejector and syllabic control network 177 employs a phase shifting network made up of capacitors 176 and 180 and resistor 183 to discriminate against steady sounds such as fans, air-conditioners or background babble from many voices but to respond to sounds simultaneously presented which contain syllabic pulsations. This circuit 177 discriminates against frequencies above 3000 cycles per second and is designed to avoid locking of the control amplifier 176 in the transmitting direction in a noisy environment.

The RM circuit 150 is fed from the incoming signal path ahead of the receiving variolosser 61 where the level is held relatively constant by manual operation of the receiving gain control 62. Following amplification in that circuit 150, the voltage clipper 154 suppresses line and background noise below a definite threshold to prevent false output when the distant party is not speaking. The RM circuit includes a disabling input from the hybrid leakage suppression rectifier to guard against false operation by hybrid leakage which under certain conditions can be at a higher level than incoming speech.

*Operation*

Figure 5:
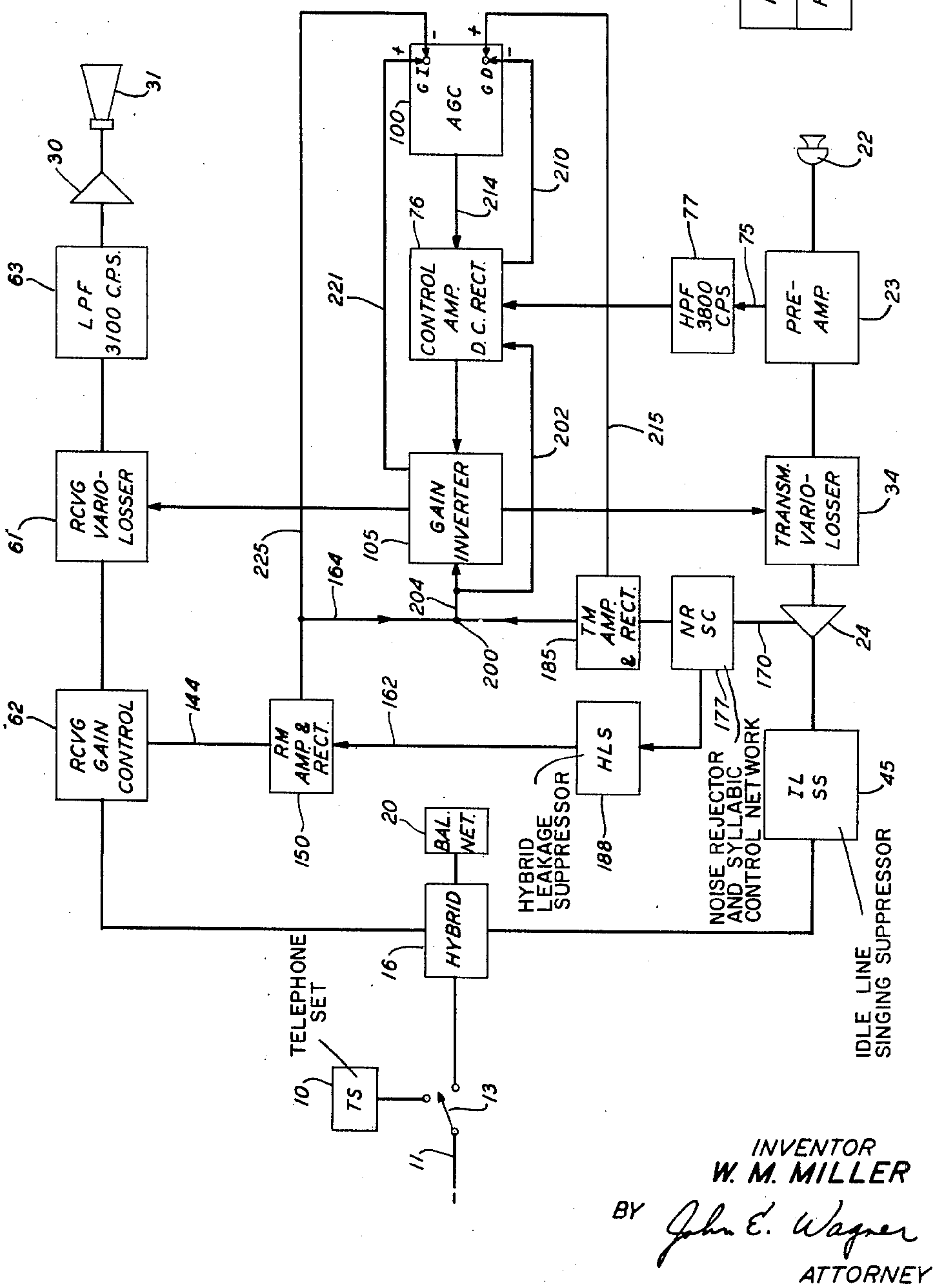
FIG. 5 is a simplified block diagram of the embodiment of FIGS. 1–4.

An understanding of the operation of this invention may be had by reference to FIG. 5 which is a simplified block diagram of the apparatus. The establishment of a call is made by lifting the handset of the telephone set 10 operating the rotary dial and closing the switch 13, whereupon the conference installation is connected to the telephone line 11 and the telephone set 10 disconnected. The installation will assume the receiving condition with the gain inverter 105 in its unoperated state. Incoming speech at the receiving gain control 62 enters the RM circuit 150 via the conductors 144 and if not blocked by local speech which would serve to disable the RM amplifier 150 via the lead 162, is amplified and rectified and emerges over the lead 164 as a negative voltage. This voltage is introduced via the lead 204 to the gain inverter 105 and forces rapid drainage of the capacitor 107 (unshown in FIG. 5), if the gain inverter 105 control is only partly operated, blocks the control amplifier 76 by a tube bias over the lead 202 and blocks the automatic gain control circuit 100 over lead 225 to prevent change in the threshold of switching. The receiving variolosser 61 is now in its minimum loss condition by conduction of tube 114 (unshown in FIG. 5) of the gain inverter 105 so incoming speech is amplified in the receiving amplifier 30 and delivered to the loudspeaker 31 at a satisfactory level which is under the control of the conferees by the receiver gain control 62.

When incoming speech ceases, the negative Receive Maintaining voltage from the RM amplifier 150 subsides restoring normal gain to the control amplifier 76 and removes the disabling voltage from the automatic gain control circuit 100, permitting it to readjust if the ambient noise level has changed.

When the installation is in its normal receiving condition with no speech incoming, locally generated sounds are amplified in the preamplifier 23 and high frequency energy from the microphone 22 passes through the high-pass filter 77 into the control amplifier 76. Since the control amplifier 76 is not blocked by a negative RM voltage from the incoming channel over leads 164 and 202, amplification and rectification takes place and a high positive voltage from the control amplifier 76 will then switch the gain inverter 105 from the receiving to the transmitting direction. Speech from the preamplifier 23 now passes through the transmitting variolosser 34 which is in its minimum loss condition and is amplified in the transmitting amplifier 24, and introduced through the idle line singing suppressor 45, the hybrid coil 16 to the telephone line 11 and network 20.

A branch circuit from the transmitting amplifier 24 introduces energy from the transmitting channel 21 into the noise rejector and syllabic control network 177 which in turn activates the TM circuit 185 over leads 204 and 202 to supply gain boost in control amplifier 76 if syllabic frequencies are present in the transmitted program material. Activation of the TM circuit 185 suspends drainage of the gain inverter control capacitor 107 insuring that the transmitting channel retains control. The branch circuit 215 from TM amplifier 185 blocks the operation of the automatic gain control 100 while speech is in progress. Simultaneously the hybrid leakage suppressor circuit 188 disables the RM circuit 150 to prevent the hybrid leakage energy reaching the receiving channel from switching the gain inverter 105 to the receiving condition.

Cessation of local speech allows the TM voltage to subside which, in turn, reenables the RM circuit 150 to permit the distant end to break in, connects a slow discharge path to the gain inverter control capacitor 107 and restores ability of the automatic gain control 100 to readjust itself if the ambient noise level is changed.

In accordance with this invention it is also possible for any of the participants of the local conference group or the remote party to interrupt or break into incoming transmissions. This break-in is accomplished easily in either direction during conversational pauses but is more difficult while speech is in progress.

In the case where the remote party is speaking, his incoming speech in addition to passing through the normally low impedance receiving variolosser 61 being amplified by the amplifier 30 and reproduced by the loudspeaker 31, also generates a negative voltage in the RM amplifier and rectifier 150. That negative voltage has disabled the automatic gain control circuit 100 and lowers the voltage of the common point 200 which disables the control amplifier and rectifier 76 insuring that the gain inverter 105 is inoperative. Any locally generated noise containing high frequencies picked up by the microphone 22 introduces an activating input to the control amplifier 76 but in the absence of a positive output from the syllabic control network 177 indicating a predominance of syllabic frequency content, the voltage of the common point remains negative and the control amplifier 76 remains disabled. However, if the locally generated sounds include syllabic frequencies as well as the higher frequencies the former must be at a sufficient level to neutralize the negative input from the RM network 150, before the control amplifier 76 will be reenabled to operate the gain inverter 105 and thereby switch the apparatus from receiving to transmitting.

Conversely, the remote party may interrupt the local speaker during conversational pauses or fluctuations when a voltage on lead 162 from the hybrid leakage suppressor 188 is insufficient to block the RM amplifier 150. In this case, by raising his voice the RM amplifier may generate a voltage sufficient to drive the common point 200 negative and thereby disable control amplifier 76.

The automatic control of loss switching is derived from high frequencies, always present in live speech, above message circuit cut-off frequency. Positive control is thus obtained with no sacrifice of useful bandwidth.

The singing path loss of the installation is substantially constant regardless of the distribution of the loss-switching control current, whether the installation is transmitting or receiving, or intermediate with both circuits at reduced net gains.

The automatic gain control circuit is disabled by speech in Either direction, and transmission peaks occurring once in several seconds are sufficient to prevent change. When free to change it adjusts the gain of control amplifier 76 until background noise just starts to switch the gain inverter.

Operation of the gain inverter control requires the actual presence of high frequency sounds in the room; to hold it operated requires low frequencies also. Release of the gain inverter control can be slow or fast as required:

(*a*) Slowly if by cessation of speech within the room (low discharge voltage applied to capacitor 107 at the gain inverter 105 input);

(*b*) rapidly if wiped out by an RM voltage, as in dialogue (high discharge voltage applied to the same capacitor).

The TM voltage is derived from a circuit capable of considerable discrimination in recognizing speech in the presence of high background noise. The syllabic control, effective when one voice is prominent over a bedlam of lower-level voices, enhances control by that one voice. Non-syllabic noise does not interfere significantly with switching.

Hybrid leakage suppression prevents false operation of the RM amplifier even when, on high loss connections, transmitted speech enters the RM amplifier at a level higher than incoming speech. The slow discharge circuit condition for capacitor 107 also prolongs blocking for line echo protection.

The TM and RM voltages ensure the complete switching of the main control, and prevent reductions in outgoing or received speech levels due to partial control by noise or other interference.

In all cases it is understood that the above-described arrangements are merely illustrative of the principles of the invention. Numerous and varied other embodiments may be devised in accordance with these principles by those skilled in the art without departing from the spirit and scope of the invention.

What is claimed is:

1. Confernece telephone apparatus comprising an incoming channel including a first gain varying network and a loudspeaker, an outgoing channel including a microphone and a second gain varying network, the gain introduced into each of said channels by said networks being of such value that the direction of preferred transmission of signals is normally through said incoming channel to said loudspeaker, means for deriving a control voltage from signals in said outgoing channel in a first selected frequency range, gain inverting means connected to said networks, means responsive to said control voltage for actuating said gain inverting means to vary inversely the gain introduced into said channels by said networks and thereby transfer the direction of preferred transmission in said apparatus from said incoming channel to said outgoing channel, frequency selective means in said incoming channel for eliminating said first selected frequency range from the signals transmitted to said loudspeaker, means responsive to energy in said outgoing channel in a second selected frequency range for maintaining said gain inverting means in said actuated condition.

2. Conference telephone apparatus in accordance with claim 1 wherein said second selected frequency range is a syllabic frequency range.

3. Conference telephone apparatus in accordance with claim 1 wherein said signals transmitted through said incoming and outgoing channels are voice frequency signals.

4. Conference telephone apparatus comprising an incoming channel including a first gain varying network and a loudspeaker, an outgoing channel including a microphone and a second gain varying network, the gain introduced into each of said channels by said networks being of such value that the direction of preferred transmission is normally through one of said channels, means for deriving first and second control voltages from signals in the other channel, gain inverting means connected to said networks, control means responsive to said first control voltage for actuating said gain inverting means to vary inversely the gain introduced into said channels by said networks and thereby transfer the direction of preferred transmission in said apparatus from said one channel to said other channel, means for deriving a third control voltage from signals in said one channel, means responsive to said third control voltage for disabling said control means in the absence of voice frequency signals in said other channel, means responsive to said second control voltage for disabling said third control voltage deriving means when voice frequency signals are present in said other channel.

5. Conference telephone apparatus comprising an incoming channel including a first gain varying network and a loudspeaker, an outgoing channel including a microphone and a second gain varying network, the gain introduced into each of said channels by said networks being of such value that the direction of preferred transmission is normally through one of said channels, means for deriving a first control voltage from signals in the other channel, gain inverting means connected to said networks, control means responsive to said first control voltage for actuating said gain inverting means to vary inversely the gain introduced into said channels by said networks and thereby transfer the direction of preferred transmission in said apparatus from said one channel to said other channel, means for deriving a second control voltage from signals in said other channel, means for deriving a third control voltage from signals in said one channel, means responsive to said third control voltage for disabling said control means in the absence of voice frequency signals in said other channel, means responsive to said second control voltage for maintaining said gain inverting means in said actuated condition when voice frequency signals are present in said other channel, said second control voltage deriving means comprising a threshold device for rendering said actuated condition maintaining means nonresponsive to signals below a predetermined threshold level, and means responsive to the presence of syllabic frequencies in said other channel for reducing the level of said threshold and disabling said third control voltage deriving means.

6. Conference telephone apparatus in accordance with claim 5 wherein said threshold device comprises two oppositely poled, equally biased asymmetrically conducting devices, and said means responsive to the presence of syllabic frequencies comprises a frequency selective network and a phase shifting network responsive to the output of said frequency selective network, said phase shifting network being connected across said asymmetrically conducting devices to produce a bias differential across said asymmetrically conducting devices in the presence of syllabic frequencies.

7. Conference telephone apparatus comprising an incoming channel including a first gain varying network and a loudspeaker, an outgoing channel including a microphone and a second gain varying network, the gain introduced into each of said channels by said networks being of such value that the direction of preferred transmission is normally through one of said channels, means for deriving a first control voltage from signals in the other channel, gain inverting means connected to said networks, means responsive to said first control voltage for actuating said gain inverting means to vary inversely the gain introduced into said channels by said networks and thereby transfer the direction of preferred transmission in said apparatus from said one channel to said other channel, means comprising a capacitor and a slow discharge path connected to said gain inverting means, means for applying said first control voltage to said capacitor, means for deriving a second control voltage from said signals in said other channel, means for applying said second control voltage to said capacitor to maintain said gain inverting means in said actuated condition.

8. Conference telephone apparatus in accordance with claim 7 wherein said slow discharge path is operative in the absence of said second control voltage to allow the discharge of said capacitor whereby said gain inverting means reverts to its unactuated condition.

9. Conference telephone apparatus in accordance with claim 8 wherein said apparatus comprises means for deriving a third control voltage from signals in said one channel, said third control voltage having a polarity opposite to that of said second control voltage, and means for applying said third control voltage to said capacitor to allow the rapid discharge thereof and rapid reversion of said gain inverting means to its unactuated condition in the presence of signals in said one channel.

10. Conference telephone apparatus comprising an incoming channel including a first gain varying network and a loudspeaker, an outgoing channel including a microphone and a second gain varying network, the gain introduced into each of said channels by said networks being of such value that the direction of preferred transmission is normally through one of said channels, means for deriving a first control voltage from signals in the other channel, gain inverting means connected to said networks, means responsive to said first control voltage for actuating said gain inverting means to vary inversely the gain introduced into said channels by said networks and thereby transfer the direction of preferred transmission in said apparatus from said one channel to said other channel, means for deriving a second control voltage from signals in said other channel, means responsive to said second control voltage for maintaining said gain inverting means in said actuated condition, means for deriving a third control voltage from signals in said one channel, means responsive to said third control voltage for neutralizing said second control voltage in the presence of signals in said one channel, automatic gain control means for establishing the threshold of operation of said gain inverting means, and means responsive to the presence of either said second or third control voltage for disabling said automatic gain control means.

11. Conference telephone apparatus comprising an incoming channel including a first gain varying network and a loudspeaker, an outgoing channel including a microphone and a second gain varying network, the gain introduced into each of said channels by said networks being of such value that the direction of preferred transmission of voice frequency signals is normally through said incoming channel to said loudspeaker, means for deriving a first control voltage from voice frequency signals in said outgoing channel in a selected frequency range, gain inverting means connected to said networks, means responsive to said first control voltage for actuating said gain inverting means to vary inversely the gain introduced into said channels by said networks and thereby transfer the direction of preferred transmission in said apparatus from said incoming channel to said outgoing channel, frequency selective means in said incoming channel for eliminating said selected frequency range from the voice frequency signals transmitted to said loudspeaker, means for deriving a second control voltage from voice frequency signals in said outgoing channel, means responsive to said second control voltage for maintaining said gain inverting means in said actuated condition, said second control voltage deriving means comprising a threshold device for rendering said actuated condition maintaining means nonresponsive to signals below a predetermined threshold level, and means responsive to the presence of syllabic frequencies in said outgoing channel for reducing the level of said threshold, means for deriving a third control voltage from voice frequency signals in said incoming channel, means responsive to said third control voltage for neutralizing said second control voltage in the presence of signals in said incoming channel.

12. Conference telephone apparatus in accordance with claim 11 comprising automatic gain control means for establishing the threshold of operation of said gain inverting means, and means responsive to the presence of either said second or third control voltage for disabling said automatic gain control means.

References Cited in the file of this patent

UNITED STATES PATENTS

| | | |
|---|---|---|
| 2,108,974 | Schott | Feb. 22, 1938 |
| 2,132,180 | Mitchell | Oct. 4, 1938 |
| 2,254,733 | Dickieson | Sept. 2, 1941 |
| 2,542,921 | Giannini | Feb. 20, 1951 |
| 2,694,749 | Hardy | Nov. 16, 1954 |
| 2,885,493 | Felder | May 5, 1959 |

FOREIGN PATENTS

| | | |
|---|---|---|
| 509,613 | Great Britain | July 19, 1939 |